United States Patent [19]

Lepley

[11] 3,828,946

[45] Aug. 13, 1974

[54] BOTTOM UNLOADING MEANS FOR SILO

[75] Inventor: James W. Lepley, Smithville, Ohio

[73] Assignee: Flying Dutchman, Inc., Smithville, Ohio

[22] Filed: Aug. 6, 1973

[21] Appl. No.: 386,196

[52] U.S. Cl............. 214/17 DA, 222/227, 222/228
[51] Int. Cl........................................... B65g 65/46
[58] Field of Search...... 214/17 D, 17 DA; 222/228, 222/227

[56] References Cited
UNITED STATES PATENTS

| | | |
|---|---|---|
| 3,567,078 | 3/1971 | Herr et al.................. 214/17 DA X |
| 3,710,960 | 1/1973 | Stauffer et al................. 214/17 DA |

Primary Examiner—Robert G. Sheridan
Attorney, Agent, or Firm—C. Hercus Just

[57] ABSTRACT

A silo arranged for unloading from the bottom by means of a central auger extending upwardly from the bottom a distance greater than the interior radius of the silo and flexible dislodging members connected at one end to said auger at vertically spaced locations between the upper and lower ends thereof, the length of said dislodging members being shortest at the lowermost member and increasing progressively among the members toward the uppermost, the longest member being next to the uppermost and the outer end of the longest being spaced from the interior of the silo wall at least 1 foot when fully extended to provide an arched ceiling in the cavity formed in the silage by said dislodging members and auger and form an annular wall of silage around the outermost boundry of the cavity which is not unduly compressed and flakes away to permit gradual descent of the mass of silage above the cavity.

6 Claims, 8 Drawing Figures

BOTTOM UNLOADING MEANS FOR SILO

BACKGROUND OF THE INVENTION

In recent years, the diameter and height of silos has gradually increased until at present, heights of 75 and 100 feet are not uncommon, and diameters of between 20 and 30 feet are quite common. Unloading the contents of silos of this range of sizes has presented many problems in the past, some of which have been solved by the introduction of bottom unloading means. Several examples of such bottom unloading means comprise the subject matter of U.S. Pat. Nos. 3,424,350, Jan. 28, 1969; 3,567,078, Mar. 2, 1971; and 3,710,960, Jan. 16, 1973.

The use of flexible chains attached to a central auger such as illustrated in the aforementioned patents has presented marked improvements over prior bottom unloading devises but it has been discovered by the present inventor that, particularly in regard to employing such augers and chains in large diameters and heights of silos, difficulties has arisen in view of the height of the auger and length of the dislodging chains employed in the devises shown in said patents, and especially those in use.

It will be seen from said patents that the length of the chains attached to the auger, commencing with the lowermost, which are the shortest, gradually increase in length unitl the uppermost chain is the longest. This arrangement of chains results in forming a residual deposit of silage in the bottom of the silo which has a funnel-shaped cavity surface which, until the silo is finally unloaded, is not disturbed. In practice, the uppermost chain on the auger was of a length slightly greater than the radius of the inner cylindrical surface of the silo and the height of the auger was not appreciably greater than the radius of said interior surface of the silo. Operation of this type of unloading mechanism resulted in the formation of a relatively flat arched dome or ceiling in the cavity formed in the mass of silage within the silo and at the periphery of said flatly arched surface, only a relatively thin wall of silage was formed by the largest, uppermost chain as it was revolved by the auger. The height of the wall was very short or practically nonexistent. Such wall of silage as existed became exceedingly compacted due to the great weight of the tremendous mass of silage above said cavity which was formed by the dislodging chains. The compacted mass was so solid in many situations that it was practically incapable of being attacked by the digging elements on the ends of the uppermost chain, so that continued rotation of the chains resulted in no further dislodgement and it was necessary for an operator to get into the cavity to dig away at the compacted masses with the consequent danger of being suffocated by falling silage after the compacted material was dislodged.

It has now been discovered that the foregoing difficulties can be obviated by making certain important changes in the dimensions of the auger and the flexible dislodging members, such as chains, connected thereto, details of which are set forth below.

SUMMARY OF THE INVENTION

It is the principal object of the present invention to provide bottom unloading means for silos and especially silos of substantial diameter and height, the unloading means comprising a shaft disposed centrally in the silo and extending upwardly from the bottom thereof a distance in excess of the radius of the interior of the silo, such excess being within the range of several feet and, while this in itself may not seem to be of great consequence, it has been found that very beneficial results have been achieved in view of such increased height in the shaft, for reasons set forth below.

It is another object of the invention to provide flexible dislodging members, such as chains, which are connected at one end to the shaft at vertically spaced distances such as of the order of between one and two feet, the lowermost chains being relatively short and successively higher chains increasing in length but the longest chains, which are connected to the upper portions of the shaft in no instance are equal in length to the radius of the interior of the silo and the digging elements on the ends of said flexible dislodging members preferably are never any closer than 1 foot from the inner surface of the walls of the silo.

A still further object of the invention is to position the longest flexible dislodging member below the uppermost dislodging member, the latter being shorter than the longest member and preferably of the order of about 1 foot shorter.

Still another object of the invention is to provide two chains of the longest dimension, the same being spaced vertically apart a similar distance to the vertical spacing between the other chains connected to the silo, both of said longest chains however being below the uppermost chain which is shorter than the longest, as set forth above, whereby the two longest chains, which preferably are vertically spaced apart at their connection on the shaft about one foot in distance, will produce a substantially cylindrical wall of silage around the periphery of the greatest dimension of the cavity, whereby said wall of silage which is between the lower conical disposition of silage and the arched ceiling of the cavity will be of the order of about 1 foot in thickness under normal circumstances and such thickness is adequate to prevent the overhead mass from unduly compacting said annular wall of silage, whereby the same gradually collapses and permits gradual descent of the mass of silage above the auger.

One further object of the invention is to arrange the uppermost flexible dislodging member to be shorter than the next member or two therebelow, which are of the greatest length of all of the members, whereby said shorter uppermost flexible member will result in digging an arched ceiling in the bottom of the overhead mass which forms the ceiling of the cavity, whereby said arch of the ceiling has a higher curvature resulting from a shorter radius than in previous arrangements of bottom dislodging augers and flexible dislodging members, thereby further relieving the pressure of the overhead mass upon the annular wall of silage at the outermost confines of the cavity within the silo.

Details of the foregoing objects and of the invention as well as other objects thereof, are set forth in the following specification and illustrated in the accompanying drawings comprising a part thereof.

DETAILED DESCRIPTION

The present invention comprises a substantial improvement over the bottom unloading devises illustrated and claimed in the aforementioned prior U.S. patents. The improvements primarily comprise extending the shaft which supports the auger a substantial distance vertically above the auger, said distance being in excess of the radius of the inner diameter of the silo. In the prior patents comprising the prior art, in no instance ever is the auger or its shaft of appreciably greater length than the radius of the interior of the silo. In contrast with the prior art also, another feature of the improvement comprises the fact that the longest flexible discharge members, specifically comprising chains, are of shorter length than the radius of the interior of the silo and, preferably, the digging elements on the outer ends of said longest dislodging member preferably are never closer than approximately one foot from the interior surface of the silo walls when said flexible members are fully extended. Under such circumstances, the full length of the flexible members is employed for dislodging purposes, where as, in contrast, in the prior art devices, at least as manufactored and sold, said longest chains were of greater length than the radius of the interior of the silo, with the result that the inner ends of the chains normally would be partially wrapped around the auger or the shaft to which they were connected so that such excess in length was useless.

Still another prime improvement of the present invention over the prior art rests in the fact that one or two flexible members of the greatest length are mounted in vertically spaced relationship along the upper portion of the shaft, these longest members being below the uppermost member which preferably is of the order of approximately 1 foot shorter than said longest members and thus resulting in the formation of a top surface or ceiling in the cavity formed within the silage mass which is more highly arched in a concave manner than the relatively flat ceiling formed by the unloading mechanism of the prior art devises.

Figure 1:
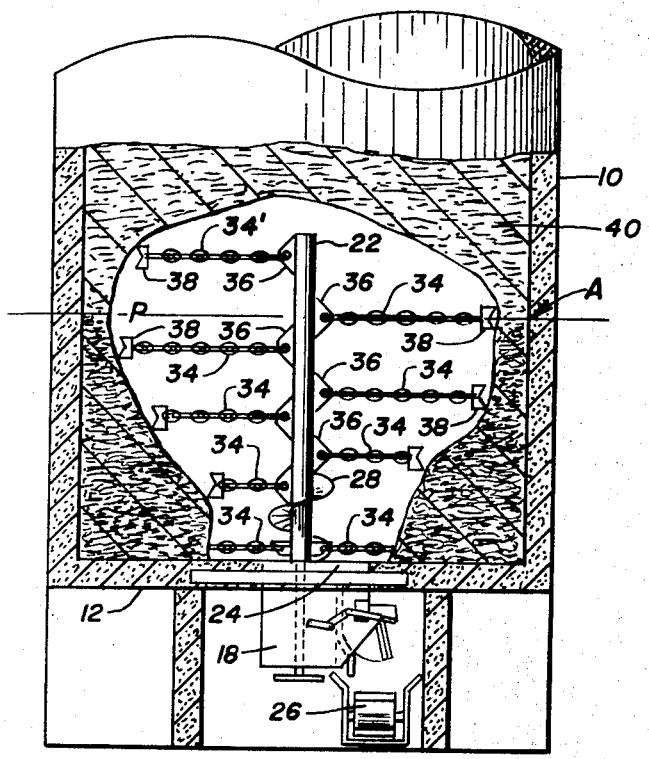
FIG. 1 is a foreshortened vertical elevation, largely in section, showing a typical silo embodying the principals of the present invention.
Figure 2:
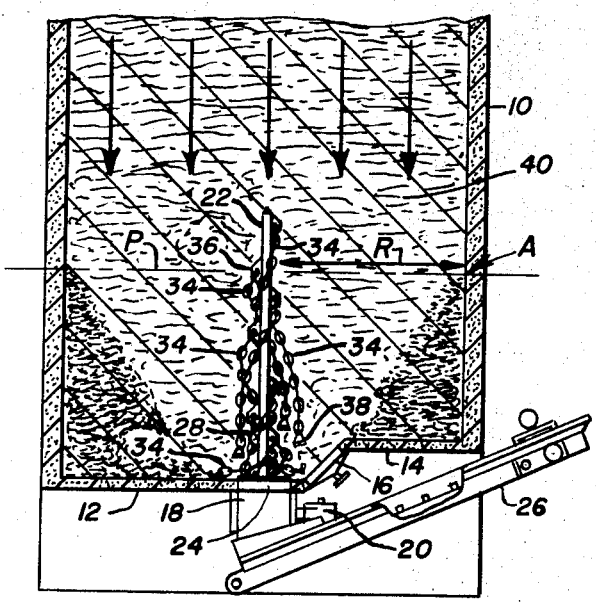
FIG. 2 is a fragmentary, vertical elevation showing the sectioned portion of the silo shown in FIG. 1 and illustrating the unloading mechanism at the time operation of the mechanism is to commence, said view illustrating the embodiment of the invention.

The exemplary structure shown in the drawings of the application by which the foregoing improvements are made available is as follows. Referring to FIGS. 1 and 2, which primarily illustrate the lower portion of a conventional silo within which the unloading mechanism of the present invention has been incorporated, the wall 10 preferably is substantially cylindrical and formed from any suitable material in accordance with conventional practice. The silo also includes a bottom 12. Said bottom may be either completely horizontal, as shown in FIG. 1, or the same may have a portion 14 at a higher elevation than the other portion of the bottom for purposes of providing an access manhole 16 shown in FIG. 2. A power unit 18 comprises a housing which is connected to the bottom 12 of the silo by any suitable means for purposes of supporting a motor 20, see FIG. 2, which is interconnected to speed-reducing means of conventional nature which are connected to the lower end of the shaft 22, the lower end of which extends through suitable bearings, not shown, mounted within the housing of the power unit 18.

A discharge opening 24 is formed in the bottom 12 of the silo adjacent one side of the lower end of shaft 22 as shown in FIG. 1. In FIG. 2, the opening 24 is viewed at 90° to that shown in FIG. 1 and therefore appears to be in vertical alignment with shaft 22. An appropriate discharge conveyor 26 receives silage discharged through the opening 24 and carries the same to suitable means such as a cart, wagon or otherwise for transportation to a feeding site.

Figure 5:
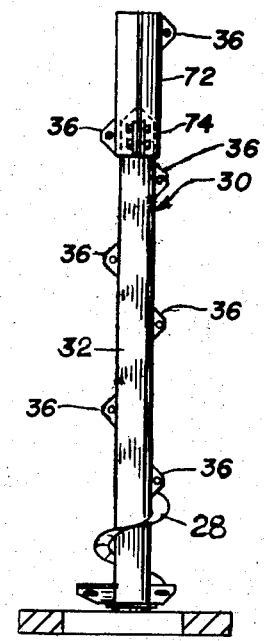
FIG. 5 is a partially fragmentary vertical elevation showing further details of the auger and the shaft associated therewith for purposes of supporting a series of flexible dislodging members which are vertically spaced relative to the shaft and one end of said members is connected to the attaching means illustrated on the shaft in said figure.
Figure 2A:
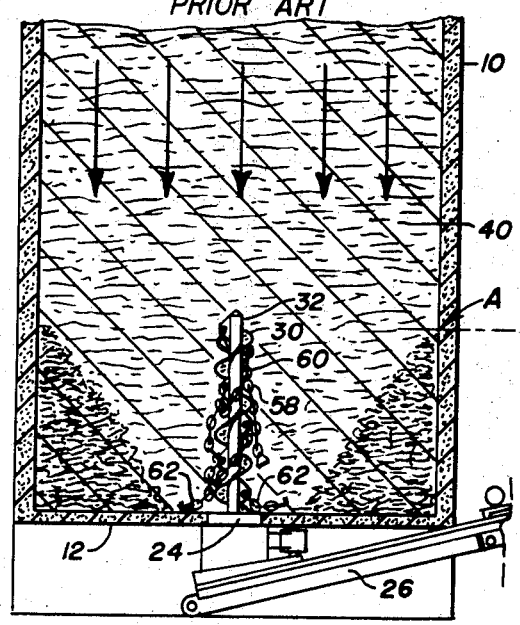
FIG. 2A is a view similar to FIG. 1 but representing a corresponding view of the unloading mechanism of the prior art for purposes of contrasting the same relative to the embodiment shown in FIG. 2.

In accordance with the present invention, as distinquished from some of the prior art structures, a relatively short auger 28 is fixed to the lower end of shaft 22 and preferably comprises only several convolutions of a flight, whereas in certain of the prior art structures, as illustrated in FIG. 2A, the auger 30 extended substantially to the top of the shaft 32. By comparing FIGS. 2 and 2A, it will be seen that the shaft 22 of FIG. 2, comprising the present invention, extends upwardly a distance from the bottom 12 substantially greater than the radius R of the interior of the silo shown in FIG. 2. In FIGS. 1 and 2, the point P represents the Point Of Radius, which corresponds to the dimension of the radius of the interior of the silo, where as it is readily seen from FIGS. 1 and 2 that an appreciable additional portion of the shaft 22 extends above the point P and this represents a substantial improvement afforded by the invention for purposes described hereinafter. As best shown in FIG. 1, a plurality of flexible dislodging members 34, specifically comprising relatively heavy duty chains, are connected at one end to the shaft 22 at vertically spaced locations, the shaft having apertured ears 36 fixed thereto for such purpose. These are best shown in FIG. 5. From this figure, it will also be seen that the members 34 vary in length sucessively and progressively from the lowermost to those adjacent the top, the shortest being at the bottom adjacent the discharge opening 24. Each of the members 34 have digging elements 38 connected to the outer ends thereof for purposes of engaging the compacted silage 40 within the silo.

Figure 3:
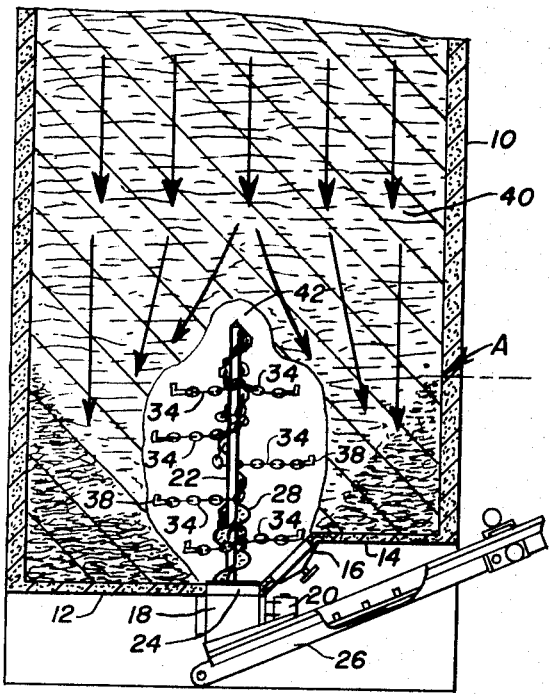
FIG. 3 is a view similar to FIG. 2 but showing an initial practical formation of a cavity within the mass of silage within the silo.
Figure 3A:
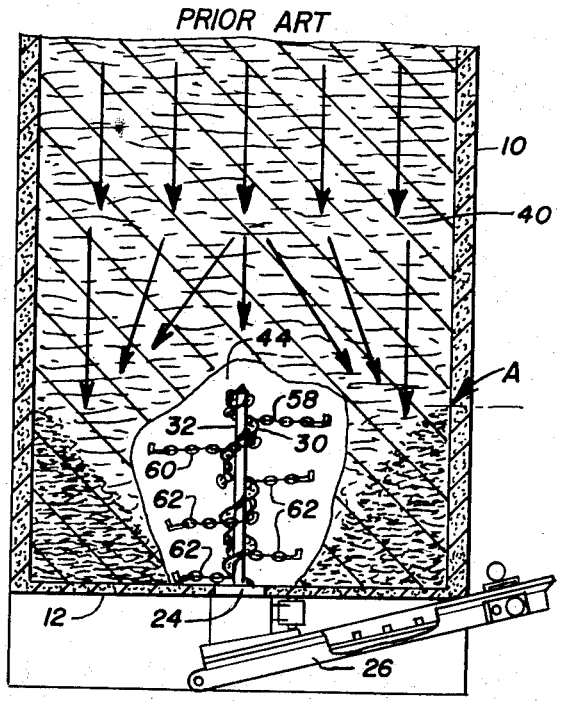
FIG. 3A is a view similar to FIG. 3 but showing a prior art unloading devise at a similar stage of initiation of an unloading operation for purposes of constrasting the same with respect to the embodiment shown in FIG. 3.

Either at the time the silo is initially filled with the silage 40 or at the conclusion of an individual unloading operation, the dislodging members 34 normally extend downwardly as shown in FIG. 2 and also in FIG. 2A. When a discharge operation is undertaken, the motor 20 is energized and the shaft 22 commences to rotate. During the initial portion of the operation, the auger 28, which rotates in the direction to cause the flights thereof to move silage downward through the discharge opening 24, causes silage which is engaged by the auger 28 forcefully to be discharged through opening 24. Engagement of the downwardly extending members 34 with the silage also causes a certain amount of dislodgement and, as this progressively occurs, centrifugal force begins to operate and cause the members 34 and the digging elements 38 on the outer ends thereof to form a vertically extending cavity 42 as shown in exemplary manner in FIG. 3. Because of the greater height of the shaft 22 in the structure of the present invention, in contrast to that of the shorter shaft 32 of the prior art, as shown in FIG. 3A, the cavity 42 is of greater height and more elongated than the cavity 44 formed by the prior art devise as shown in FIG. 3A.

Figure 4:
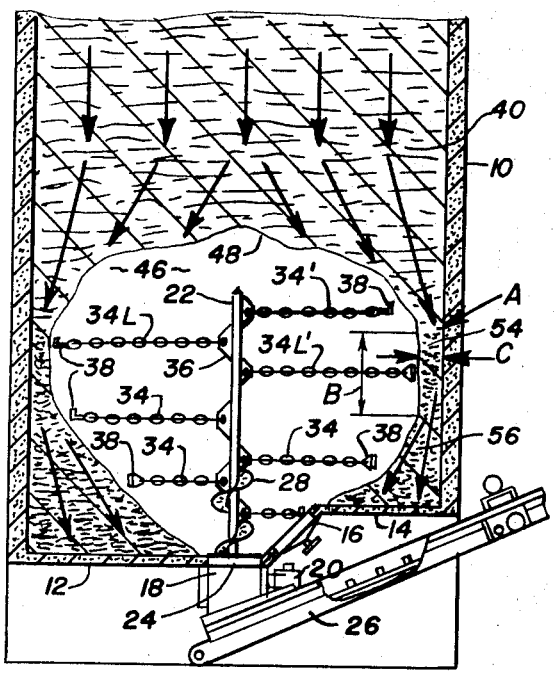
FIG. 4 is a view similar to FIG. 3 but showing the formation of a substantially complete configuration of cavity within the mass of silage and the silo, as produced in accordance with the unloading mechanism embodying the principals of the present invention.

As expansion of the cavity 42 continues, centrifugal force gradually extends the flexible members 34 substantially to their full lengths, as shown in FIGS. 1 and 4. In these views, the differences in length of the flexible members 34 readily is apparent. These differences cause the formation of the substantially final size of cavity 46 which is formed by the unloading devise comprising the present invention. It will be seen that this cavity has a much higher and more extensively arched top surface or ceiling 48 than the relatively flat ceiling of the cavity 52 formed by the prior art structure as illustrated in FIG. 4. These differences in the shapes of the respective cavities 46 and 52 is due to the following phenomenon.

In the structure of the present invention, not only is the shaft 32 of greater height than the shaft 32 of the prior art, but in addition, as clearly shown in FIGS. 1 and 4, the uppermost flexible member 34' is slightly shorter than the longest flexible member 34L which is the next one down on the shaft 22 from the uppermost member 34'. In actual practice, particularly where the silo is of the order of about 20 feet in diameter, it is preferred that the uppermost member 34' be approximately 1 foot shorter than the longest member 34L. In addition, there is a second longest member 34L' which is substantially of equal length with the other longest member 34L but spaced about a foot or more below the same on shaft 22 for purposes of forming a substantially annular wall 54 of silage which, for example, has an exemplary height of B as shown in FIG. 4. Said wall is substantially of uniform thickness C. In actual practice, the dimension C is approximately 1 foot, where as the dimension B may be between 1 and 2 feet. The annular wall section 54 of silage also will be approximately 10 or 12 feet above the bottom 12 of the silo, depending upon whether or not the silo is of a diameter of 20 or 24 feet respectively.

Because of the indicated thickness of the annular wall 54 which is between the funnel-shaped compacted silage mass 56, reposing upon the botton 12 of the silo, and the somewhat extensively arched configuration of the ceiling 48 of cavity 46, the consistency of the silage in the annular wall 54 does not become abnormally compacted by the weight of the mass of silage 40 above the cavity 46. The consistency of said mass of the annular wall 54 of silage is such that it progressively flakes off as the digging members 38 flail around during the unloading operation, with the result that said wall gradually gives way due to the gradual descent of the upper mass 40 which, in silos of substantial diameter and height, can be of very substantial proportions, amounting to many tons. Also, when the wall 54 of silage reaches a height of approximately 1 foot, it will commence to collapse and this brings the ceiling 48 downward for further engagement, for example, by the uppermost flexible members 34' and 34L, for example, for further dislodgment of silage material which drops downward toward the discharge opening 24, meanwhile being further disingrated by the lower, shorter flexible members 34.

Figure 4A:
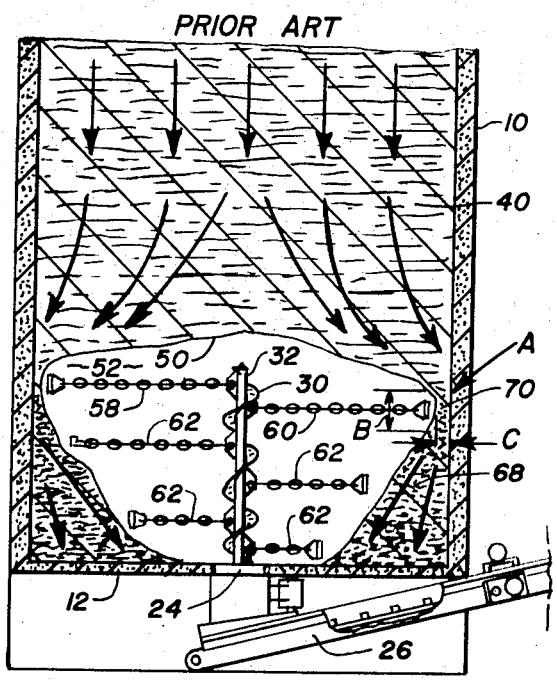
FIG. 4A is a view similar to FIG. 4 but showing a corresponding prior art unloading devise and a cross sectional view of the maximum size of cavity produced by such devise for purposes of contrasting the same with respect to the cavity formed by the present invention.

In contrast to the foregoing, as viewed in FIG. 4A, which represents prior art structure presently in use, the uppermost flexible member 58 is the longest and the next member 60 below it preferably is at least a little shorter. The additional flexible members 62 below members 58 and 60 are progressively shorter, with the shortest being near the discharge opening 24. Because of the fact that the longest member 58 is uppermost and is connected to the upper end of the shaft 32 which is not appreciably greater in height than the radius of the interior diameter of the silo, and normally is a little shorter than radius dimension, it will be seen that the ceiling 48 of the prior art cavity 50 is relatively flat. Also, the periphery of the ceiling 48 engages the upper edge of the funnel-shaped lower mass of silage 68 at an intermediate section 70 which extends vertically for only a matter of a few inches, indicated letter B in FIG. 4A, and the thickness thereof, letter C, is also of only a matter of a few inches, whereby it will be seen that the tons of pressure exerted by the overhead mass 72 of silage results in tremedous pressure being exerted upon the intermediate section 70 of silage, with the result that it becomes so compact that under some circumstances which have been experienced, the digging elements on the ends of the flexible members 58, 60 and 62, and especially those on the longest member 58, are ineffective to dislodge the material, whereupon it has been experienced on those occasions that further unloading operations are at a standstill until emergency measures are resorted to such as by a worker getting into the cavity through the usual manhole, for example, which normally is provided in the bottom 12 of the silo, similar to manhole 16 shown in FIGS. 2–4, to chip away at the compacted material 70, with the consequent risk of being inundated by the falling material. Thus, it will be seen that the greater thickness of the wall 54 of the present invention, as shown in FIG. 4 and the much more extentsively arched ceiling 48 in the lower end of the mass 40 of overhead material produces far less compactness in the annular wall 54 of the material which gradually flakes away and collapses, which results in the lowering of the ceiling 48 for further engagement by the uppermost flexible members 34', 34L and otherwise.

In order that the advantages of the present invention might be added to existing silos and bottom-unloading mechanism included therein, attention is directed to FIG. 5 in which it will be seen that the shaft 32 of the prior art such as illustrated in FIGS. 2A–4A, may have an extension 72 connected to the upper end thereof by means of a clamping sleeve 74, or otherwise. The extension 72 also has an apertured ear 36 connected thereto, as also may be provided on the clamping sleeve 74, if desired. Then, by providing the flexible members 58, 60 and 62 of the prior art with dimensions corresponding to the flexible members 34', 34L, 34L' and 34 of the unloading mechanism comprising the present invention, the advantages thereof then will be capable of being achieved in existing silos. Therefore, by increasing the height of the existing shaft 32 of the prior art devises, the advantages of the higher shaft of the present invention are achieved, together with the modified lengths of the flexible members, which will result in the formation of a thicker annular wall around the periphery of the improved shape of cavity 46 formed in the silage mass, as well as the greater height of said wall such as illustrated in FIG. 4.

From the foregoing, it therefore will be seen that the present invention offers substantial improvements over the operational characteristics of bottom unloading mechanisms of the prior art through the use of a center shaft having a height greater than the radius of the interior of the silo, providing the uppermost flexible dislodging member somewhat shorter than the longest dislodging member for purposes of forming a higher arched ceiling in the cavity, and also preferably utilizing a pair of flexible members of the greatest length in vertically spaced relationship to each other to form a peripheral wall of silage around the greatest diameter of the cavity which has a reasonable height and thickness which is much less compacted than the peripheral wall in the cavity of previously used bottom unloader devices, whereby said wall gradually collapses and flakes away, followed by consequent lowering of the ceiling of the cavity for progressive dislodgement of silage therefrom by the flexible members attached to the upper portion of the shaft. Further, the auger is provided only at the lower portion of the shaft since this has been found to be sufficient, especially for initial discharge purposes, thereby leaving the remaining upper portion of the shaft free with less tendency for the flexible dislodging members to become entangled in any way either with the auger or otherwise.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. Feeding and discharge means for a bottom unloading type silo comprising in combination, a substantially cylindrical silo having a bottom and a height substantially in excess of the interior diameter thereof, a shaft extending upwardly substantially from the center of said bottom and having an auger on the lower portion thereof, a discharge opening in said bottom adjacent said auger, power means connected to said shaft and operable to rotate the same in a direction to cause the flights of said auger to move silage downward toward and through said discharge opening, a plurality of flexible dislodging members each connected at one end to said shaft at vertically spaced locations, said members being of progressively increased length from the lowermost member which is shortest to members which are adjacent the upper end of said shaft, said longest members being shorter than the interior diameter of the silo when fully extended in use, silage digging elements connected to the outer ends of said flexible members, and the uppermost flexible member being shorter than the next highest member on said shaft, whereby when said shaft is rotated within the silo when at least partially filled with silage said flexible members and digging elements thereon form a cavity within said silage having a funnel-shaped lower portion and a substantially arched concave ceiling surface to prevent the annular wall of silage formed by the longest flexible members from being unduly compressed so as to permit the silage to progressively collapse and thereby cause gradual descent of the mass of silage above said shaft.

2. The feeding and discharge means for a silo according to claim 1 in which the height of said shaft above the bottom of said silo is greater than the radius of the interior thereof and the longest of said flexible members being connected to said auger below the upper end of said shaft.

3. The feeding and discharge means for a silo according to claim 2 in which said longest of said flexible members is connected to said shaft at a distance above the bottom of said silo substantially equal to the interior radius of said silo.

4. The feeding and discharge means for a silo according to claim 1 in which there is at least one flexible member connected to the upper end of said shaft above said longest flexible member and said one flexible member being shorter than said longest member.

5. The feeding and discharge means for a silo according to claim 4 in which there are two of said longest flexible members of substantially equal length connected to said shaft below the uppermost member and also spaced vertically apart a limited distance to form a cylindrical wall of silage of substantially uniform thickness around the outermost periphery of said cavity within said silage.

6. The feeding and discharge means for a silo according to claim 1 in which the digging elements for the longest of said flexible members are spaced at least substantially one foot from the interior surface of said silo when said flexible member is fully extended in operation.

* * * * *